(12) United States Patent
Hawrysz

(10) Patent No.: US 7,725,379 B2
(45) Date of Patent: May 25, 2010

(54) SYSTEM AND METHOD FOR SETTLING TRADES

(75) Inventor: Joseph E. Hawrysz, Aurora, IL (US)

(73) Assignee: Board of Trade of the City of Chicago, Inc., Chicago, IL (US)

( * ) Notice: Subject to any disclaimer, the term of this patent is extended or adjusted under 35 U.S.C. 154(b) by 76 days.

(21) Appl. No.: 11/879,185

(22) Filed: Jul. 16, 2007

(65) Prior Publication Data

US 2009/0024509 A1   Jan. 22, 2009

(51) Int. Cl.
*G06Q 40/00* (2006.01)

(52) U.S. Cl. .................. 705/36 R; 705/35; 705/38; 283/57; 283/58; 283/59

(58) Field of Classification Search ............ 705/38, 705/36 R; 285/57–59
See application file for complete search history.

(56) References Cited

U.S. PATENT DOCUMENTS

| | | | |
|---|---|---|---|
| 7,373,320 B1 * | 5/2008 | McDonough | ............... 705/35 |
| 2002/0023045 A1 | 2/2002 | Feilbogen et al. | |
| 2002/0120555 A1 | 8/2002 | Lerner | |
| 2003/0933362 | 5/2003 | Tupper et al. | |
| 2004/0128223 A1 | 7/2004 | Kuhn et al. | |
| 2005/0086152 A1 | 4/2005 | Sweeting | |
| 2005/0137956 A1 | 6/2005 | Flory et al. | |
| 2006/0085319 A1 | 4/2006 | Nangalia et al. | |
| 2006/0106708 A1 | 5/2006 | Abushaban et al. | |
| 2006/0112000 A1 * | 5/2006 | Ellis et al. | ............... 705/37 |
| 2006/0253377 A1 * | 11/2006 | Burns et al. | ............... 705/37 |
| 2008/0114702 A1 * | 5/2008 | Hawrysz | ............... 705/36 R |

FOREIGN PATENT DOCUMENTS

WO     WO 01/77940     10/2001

OTHER PUBLICATIONS

International Search Report and Written Opinion in PCT/US08/08686 dated Dec. 16, 2008.

* cited by examiner

*Primary Examiner*—Kirsten S Apple
(74) *Attorney, Agent, or Firm*—McCracken & Frank LLP

(57) ABSTRACT

A method of settling trades includes the steps of obtaining an authenticated delivery instrument, wherein the authenticated delivery instrument is authenticated by a first exchange and may be used to settle a trade undertaken on the first exchange. An electronic proxy is issued for the delivery instrument, wherein the electronic proxy may be exchanged for the authenticated delivery instrument and where the electronic proxy is used to settle a trade undertaken on a second exchange.

12 Claims, 3 Drawing Sheets

SYSTEM AND METHOD FOR SETTLING TRADES

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to authenticated delivery instruments and more particularly to a system and method that enables traders to settle trades using an electronic proxy for delivery.

2. Description of the Background of the Invention

Exchanges enable buyers and sellers to trade financial instruments such as stocks, bonds, options, cash, agricultural products, commodities, and futures, etc. A futures contract is a financial instrument that represents a potential legal obligation for delivery or acceptance of another financial instrument or an underlying commodity at a specified time in the future. The financial instrument that underlies a futures contract may include a quantity of grains, metals, oils, bonds, securities, or cash. The exchange establishes a futures contract specification that defines at least the underlying product, a quantity of the underlying product represented by one futures contract, and a contract month (the month in which the delivery may take place). The specification defines the expiry month for a futures contract in terms of a month and a year and the futures contract may not be traded after a predetermined day of the defined month and year. The potential legal obligation represented by the futures contract to deliver the underlying product becomes a real legal obligation for the seller of the futures contract when the futures contract expires. Similarly, the potential legal obligation represented by the futures contract to accept delivery of the underlying product becomes a real legal obligation when the seller of the futures contract declares an intention to deliver. Additionally, exchanges facilitate buying and selling of other types of contracts including cash contracts and cash forward contracts, which may involve delivery of a commodity in the future.

A futures contract may be traded in a physical exchange where buyers and sellers meet. A buyer and a seller use an open outcry auction process among other buyers and sellers to negotiate a price at which to buy and sell, respectively, a quantity of the futures contracts. After the buyer and seller agree upon the quantity and the price, the buyer and the seller each report his/her portion of the trade to the exchange. The information reported by the buyer comprises identification information about the buyer, who the buyer believes is the seller, the quantity the buyer believes has been purchased, and the price to be paid thereby. Similarly, the seller reports information comprising identification information thereof, who the seller believes is the buyer, and the quantity the seller believes has been sold and the price to be received thereby. In some cases, the exchange encodes and transmits to a clearinghouse the information reported by the buyer and the seller separately as two sets of trade data. Alternately, the exchange creates and transmits to the clearinghouse matched trade data that comprises the information reported by both the buyer and the seller.

A futures contract may also be traded in an electronic exchange where a trader submits an order to a trading host. The order is either a bid or an offer that indicates a desire to purchase or sell, respectively, the futures contract. The order identifies, at least, the futures contract, the quantity of the futures contract the trader wishes to buy or sell, the price at which the trader wishes to buy or sell the futures contract, and a direction of the order (i.e., whether the order is a bid or an offer). The trading host monitors orders that are received thereby to identify a bid for the futures contract at a particular price with an offer for the same futures contract at the same or lower price. Similarly, the trading host monitors orders that are received thereby to identify an offer for the futures contract at a particular price with a bid for the same futures contract at the same or higher price. Upon identification of the bid and the offer, a quantity associated therewith is matched and the quantity, price, and identification information regarding the buyer and seller are transmitted to the clearinghouse as matched trade data.

The clearinghouse settles the accounts of the members, clears trades, collects and maintains margin funds, and reports trade data. Each trading firm that holds membership in the clearinghouse becomes liable to the clearinghouse for all trades made on the behalf of the trading firm or a customer of the trading firm. The trading firm with which the trader is associated guarantees delivery or receipt obligations of the trader. Furthermore, the clearinghouse oversees and insures that obligations made by the trader are carried out in a timely fashion.

At the end of every trading session, the clearinghouse reconciles trading data received thereby from an exchange and transmits cleared trade data to a clearing firm associated with each trader. Thereafter, each clearing firm "marks to market" the account of each trader associated therewith. That is, the clearing firm records the net position of each trader in accordance with any changes in the prices of the futures contracts in which the trader has an open position. The trading firm also confirms that the trader has sufficient margin funds on deposit to support the net position thereof.

The specification of a futures contract that requires delivery of an underlying product defines the characteristics (e.g., grade, purity, weight, etc.) of the underlying product that is to be delivered. Typically, the delivery or acceptance obligations associated with the futures contract may begin at anytime during the delivery month and must be fulfilled within a predetermined number of business days after the last trading day of the delivery month.

During the expiry month, a trader holding an open long position a particular futures contract may have to take delivery when the trader holding a short position in that futures contract decides to make delivery. Furthermore, the specification of the futures contract defines the last day by which the seller must complete delivery. The clearing firm representing the seller notifies the clearinghouse that the seller wants to deliver on a futures contract. The clearinghouse notifies both the seller and the clearing firm representing the buyer. The clearing firm representing the seller forwards an invoice to the clearinghouse, which in turn forwards the invoice to clearing firm representing the buyer. On the day when delivery is to take place, the clearing firm representing the buyer presents a certified check or other payment instrument (including electronic transfers of funds) for the amount due to the clearing firm representing the seller. After the clearing firm representing the seller receives payment for the amount due, the clearing firm representing the seller transfers a paper delivery instrument (normally a warehouse receipt or a vault receipt) to the clearing firm representing the buyer.

The paper delivery instrument is issued by a warehouse (if the underlying product is a grain or other agricultural product) or a vault (if the underlying product is a metal) where the underlying product is stored. The buyer can then present the paper delivery instrument to the issuer (either warehouse or vault) to redeem the underlying product.

The exchange authenticates the paper delivery instrument as representing a quantity of product that meets specification defined by the exchange and denotes the authentication by marking the paper delivery instrument with an indicium corresponding to the exchange. For example, the exchange may specify the weight and fineness of a bar of gold that may be used to deliver on a contract acquired at the exchange. The paper delivery instrument bearing the indicium corresponding to the exchange provides assurance that the bar of gold meets the standards that the exchange has set forth. Typically, a paper delivery instrument is marked with an indicium corresponding to a particular exchange. Additionally, some exchanges require that delivery of underlying futures contracts traded at such exchanges must be accomplished using paper delivery instruments bearing the indicium corresponding to the exchange.

In some cases, typically involving agricultural products, the exchange, the clearing firms, and the clearinghouse use electronic receipts instead of paper receipts to facilitate delivery. Specifically, an electronic receipt is an entry in a database record associated with a clearing firm that indicates that a trader associated with the clearing firm owns a quantity of a product. The electronic receipt typically includes information generated by the exchange that indicates that the electronic receipt is authentic and that the exchange has verified that the underlying product meets the specifications set the exchange.

In some instances, the database entry for the electronic receipt is associated with an account the clearing firm has at a clearinghouse. In other instances, the database entry is associated with an account at the exchange. Typically, clearing firms maintain records that associate a trader who owns a product and the electronic receipt that represents the product. Such records are typically associated with an account the trader has at the clearing firm and are notations in a database record corresponding to the account. In order to deliver a product, the seller authorizes the clearing firm associated therewith to transfer an electronic receipt to an account associated with the buyer. As with paper receipts, electronic receipts are bearer receipts in that the holder of the electronic receipt may request physical delivery of the product represented by the electronic receipt. Typically, the holder of the electronic receipt notifies the clearing firm that delivery is desired, and the clearing firm subsequently notifies the warehouse or vault to provide delivery to the holder. In some cases, the holder of the electronic receipt notifies the exchange that delivery is desired and the exchange notifies the warehouse or vault to provide delivery to the holder. Upon notification, the warehouse or vault provides the underlying good to holder and notifies the clearing firm or exchange that the good has been delivered. Typically, the notifications described above are communications that are sent between systems operated by entities (i.e., the clearing firm, the exchange, the clearinghouse, and the issuer) that participate in the delivery. In some cases, a staff member at one of the entities may communicate with a staff member at another entity to facilitate the delivery process. The clearing firm or the exchange thereafter voids the electronic receipt.

There are risks to both the buyer and seller associated with the handling and transportation of the paper delivery instrument. The paper delivery instruments can be lost or damaged and typically, the paper delivery instruments are bearer instruments so anyone presenting the instrument can take delivery of the underlying product. In addition, the vault or warehouse may be in a location remote from the exchange and/or the buyer and, in such cases, the buyer may have to arrange for transportation of the physical delivery instrument to an agent for the buyer where the vault or warehouse is located.

Furthermore, if a trader wishes to use a delivery instrument authenticated by a first exchange to deliver on trades made at a second exchange, the second exchange may have to verify that the product represented by the delivery instrument at least meets the requirements for products specified by the second exchange. In such cases, either the trader or the second exchange may incur costs and delays associated with the verification process. The second exchange may undertake such costs if the market provided by the second exchange alternative to an established market in the product provided by the first exchange. However, such expenditures add to the cost of operating the market.

SUMMARY OF THE INVENTION

According to one aspect of the invention, a method of settling trades includes the steps of obtaining an authenticated delivery instrument, wherein the authenticated delivery instrument is authenticated by a first exchange and may be used to settle a trade undertaken on the first exchange. An electronic proxy is issued for the delivery instrument, wherein the electronic proxy may be exchanged for the authenticated delivery instrument and where the electronic proxy is used to settle a trade undertaken on a second exchange.

Other aspects and advantages of the present invention will become apparent upon consideration of the following detailed description.

DETAILED DESCRIPTION OF THE PREFERRED EMBODIMENTS

Figure 1:
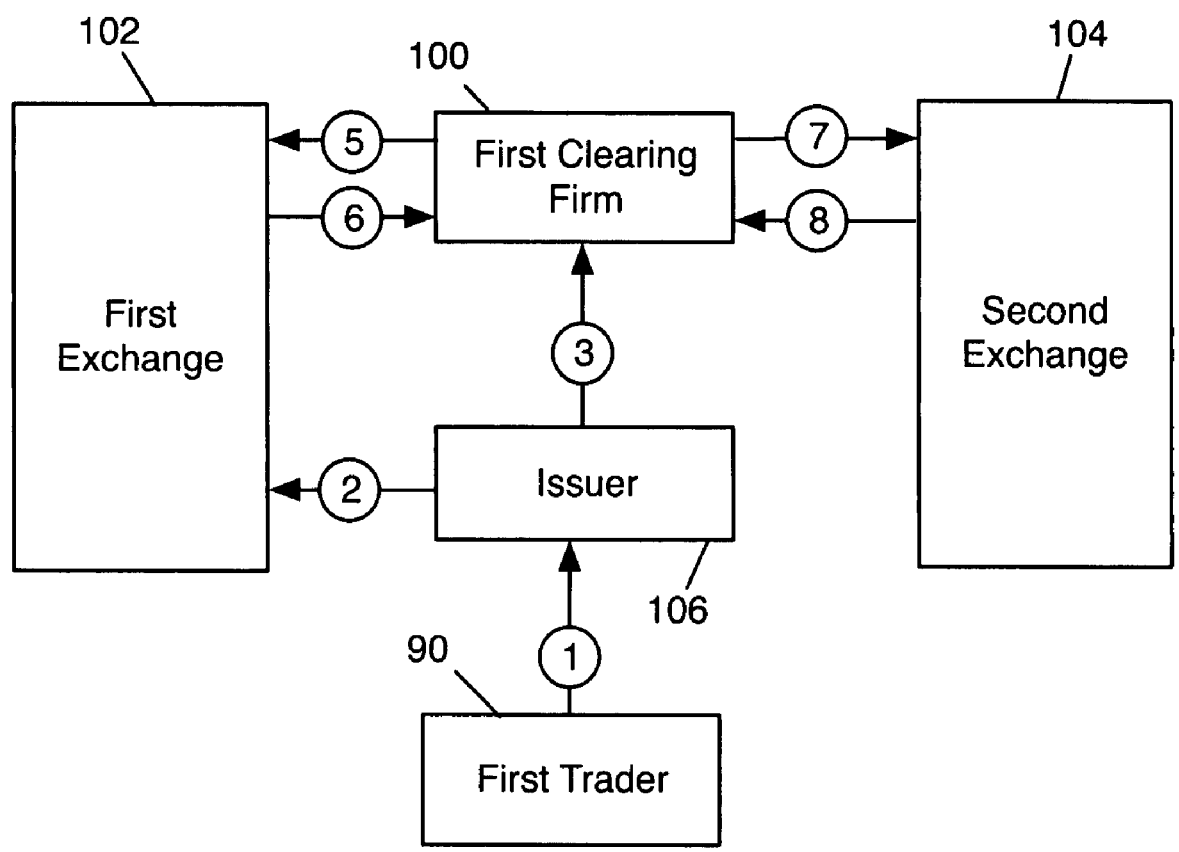
FIG. 1 shows a logical block diagram of obtaining a delivery instrument and a proxy therefor.

FIG. 1 illustrates how a first trader 90, who is authorized to trade at a first exchange 102 and a second exchange 104, obtains a delivery instrument and a proxy therefor. In particular, the first trader 90 deposits (shown by arrow 1) a quantity of a product at an issuer 106, wherein the deposited product underlies futures contracts that are traded at the first exchange 102 and the second exchange 104. The issuer 106 verifies that the deposited product meets the requirements for the product underlying the futures contract as specified by the first exchange 102. The issuer 106 thereafter notifies the first exchange 102 of the deposit (arrow 2) and issues a delivery instrument to a first clearing firm 100 (arrow 3) where the first trader 90 has an account. In some cases, the issuer 106 provides the delivery instrument to the first trader 90 who thereafter provides it to the first clearing firm 100. The delivery instrument may be a physical bearer receipt or an electronic receipt. If the delivery instrument is an electronic receipt, the first exchange 102 makes an entry in a database record associated with an account associated with the clearing firm 100 that indicates that the first trader 90 has deposited the quantity of product at the issuer 106. The first clearing firm 100 also makes an entry noting the deposit in an account associated with the first trader 90. If the first trader 90 wishes to use the delivery instrument to fulfill delivery obligations associated with trade conducted at the first exchange 102, the first clearing firm 100 presents the delivery instrument to the first exchange 102 for authentication (arrow 5). The first exchange 102 verifies that the product represented by the delivery instrument meets the requirements defined in specifications established thereby and, typically, affixes an indicium to the delivery instrument that indicates an authenticated delivery instrument. The first exchange 102 returns the authenticated delivery instrument to the first clearing firm 100 (arrow 6). The first trader 90 may use the delivery instrument to fulfill delivery obligations associated with a sale of a futures contract at the first exchange 102.

In some cases, the first trader 90 may also be an issuer 106. For example, a grain facility or an energy producer may trade futures contracts and also provide physical delivery of products for fulfilling delivery obligations. In such cases, referring once again to FIG. 1, the first trader 90 provides the first clearing firm 100 with collateral as a guarantee that the first trader 90 is able to provide delivery of a quantity of a product (arrow 3). The first clearing firm 100 thereafter requests authenticated delivery instruments from the first exchange 102 (arrow 5) for the quantity of product guaranteed by the first trader 90. The first clearing firm 100 may maintain the collateral provided by the issuer 106 or send the collateral to the first exchange 102. The first exchange 102 issues authenticated delivery instruments (arrow 6). The first clearing firm 100 thereafter provides the authenticated delivery instruments to the second exchange 104 (arrow 7), which issues proxies therefor (arrow 8). The collateral provided by the issuer 106 (that is also the first trader 90) may be a letter of credit, an inventory report, or another indication that the issuer 106 is able to deliver product when necessary.

If the first trader 90 seeks to use the product deposited at the issuer 106 to fulfill delivery obligations associated with trades of futures contracts on either the first exchange 102 or the second exchanges 104, the first clearing firm 100 provides the delivery instrument to the second exchange 104 (arrow 7). Thereafter, the second exchange 104 verifies the authenticity of the delivery instrument and issues a proxy for the delivery instrument to the first clearing firm 100 (arrow 8). Typically, the proxy is an entry in a database record that is used to track an account associated with the first clearing firm 100 at the second exchange 104 or at a clearinghouse. The database notation for the proxy typically comprises a digital signature or other authentication data that an exchange uses to authenticate the notation. In some cases, the first trader 90 may wish to make deliveries on trades conducted at the first exchange 102 and at the second exchange 104 using the product previously deposited at the issuer 106. In such cases, the first trader 90 provides the receipt associated with the previously deposited product to the first clearing firm 100, which then undertakes authenticating the receipt and obtaining a proxy described in the foregoing.

Figure 2:
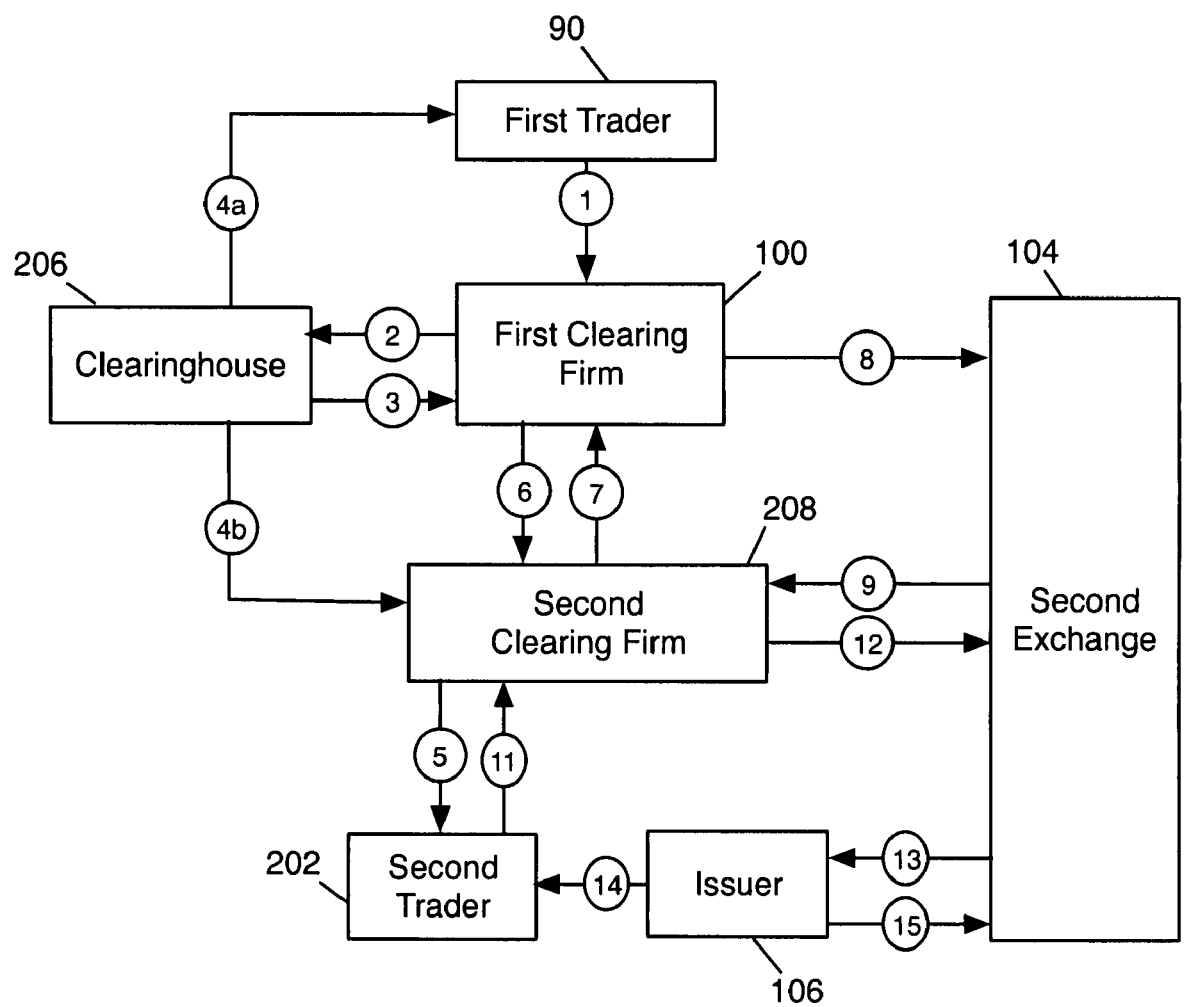
FIG. 2 depicts a logical block diagram of a system and method of settling trades using the delivery instrument and proxy obtained in the manner depicted by FIG. 1.

FIG. 2 shows how a delivery obligation for the first trader 90 associated with a sale of a futures contract on the second exchange 104 is fulfilled. Specifically, suppose that the first trader 90 has sold a futures contract to a second trader 202 on the second exchange 104, for example, by using an electronic platform provided by the second exchange 104 or by participating in an open outcry auction. The first trader 90 notifies the first clearing firm 100 associated therewith of a desire to initiate delivery (arrow 1). The first clearing firm 100 notifies a clearinghouse 206 (arrow 2) that the first trader 90 seeks to initiate delivery. The clearinghouse 206 notifies the first clearing firm 100 and a clearing firm 208 that is associated with the second trader 202 (i.e., the buyer) with pertinent details regarding the delivery (arrows 4a and 4b). Such pertinent details include the identities of the first and second clearing firms, 100 and 208 respectively, the quantity of the underlying product to be delivered, and the amount of money to be paid for the product. Typically, the amount of money that is paid for the product is the settlement price of the futures contract established on the day the first trader 90 declares the intent to deliver. The pertinent details may also include the location where the delivery is to occur and a time by when delivery must be completed, The second clearing firm 208 notifies the second trader 202 (arrow 5) that the first trader 90 intends to deliver (arrow 5). The first clearing firm 100 thereafter forwards an invoice to the second clearing firm 208 (arrow 6) based on the details provided by the clearinghouse 206. The second clearing firm 208 sends payment for the amount due per the invoice to the first clearing firm 100 (arrow 7). The payment may be in the form of a bank draft, a certified check, an electronic transfer of funds, or another payment instrument the first clearing firm 100 is able to accept. After receiving the payment, the first clearing firm 100 sends a request to the second exchange 104 that the proxy for the delivery instrument be transferred to the second clearing firm 208 (arrow 8). Specifically, the first clearing firm 100 generates a message that includes the proxy data and information identifying the trade being settled and sends the message to the second exchange 104. The first clearing firm 100 thereafter adjusts the account of the first trader 90 to indicate the transfer of the product represented by the proxy. The second exchange 104 validates the messages sent by the first clearing firm 100 and deletes the entry associated with the proxy in an account associated with the first clearing firm 100 and creates an entry for the proxy in an account associated with the second clearing firm 208. The second exchange 104 then sends a message to the second clearing firm 208 notifying the second clearing firm 208 that ownership of the proxy has been transferred (arrow 9) and that delivery obligations of the first trader 90 and the second trader 202 have been fulfilled. In some embodiments, the first clearing firm 100 does not wait for the payment to be received from the second clearing firm 208 before sending the request to the second exchange 104 that the proxy be transferred to the second clearing firm 208. In some cases, the first clearing firm 100 sends the message to the second exchange 104 requesting the transfer of the proxy before the second firm 208 provides payment. In other cases, the first clearing firm 100 sends the request for the transfer of the proxy and the second clearing firm 208 provides payment concurrently. In some embodiments, a system at the second exchange 104 monitors the activity between the clearinghouse 206 and the first and second clearing houses, 100 and 208, respectively, and automatically initiates the transfer of the proxy. As noted above, typically, the communications between the entities that participate in the delivery process are transmissions of messages between systems operated between such entities. In some cases, a staff member at one entity may communicate directly with a staff member at another entity to facilitate the delivery process. In addition, a staff member at an entity may instruct a system at the entity to send a message to a system at another entity.

Upon receiving the message from the second exchange 104 that the proxy has been transferred, the second clearing firm 208 creates, in a database thereof, an entry in a record that is associated with the second trader 202 that indicates that the second trader 202 owns the underlying product associated with the proxy. Typically, the clearinghouse 206 operates systems that track the accounts of clearing firms and clearing firms operate system that track accounts of traders associated therewith. Further, a clearing firm communicates with other clearing firms, exchanges, and clearinghouses on behalf of traders associated with the clearing firm.

Once the entry for the proxy has been made to the account of the second trader 202, the second trader may use the proxy to effectuate delivery on an obligation due to another trade made by the second trader 202. If the second trader 202 seeks to obtain possession of the good represented by the electronic proxy, the second trader 202 notifies the second clearing firm 208 (arrow 11) of the need for physical delivery. The second clearing firm generates and sends a message to the second exchange 104 (arrow 12) notifying the second exchange 104 that the second trader 202 seeks physical delivery. The second exchange 104 sends a message to the issuer 106 to provide physical delivery to the second trader 202 (arrow 13). Thereafter second trader 202, or a representative thereof, may claim the physically delivery from the issuer 106 of the product represented by the proxy (arrow 14). The issuer notifies the second exchange 104 that the underlying good has been transferred to the second trader (arrow 15), and the second exchange 104 nullifies the proxy associated with the underlying good and the delivery instrument represented by the proxy.

Figure 3:
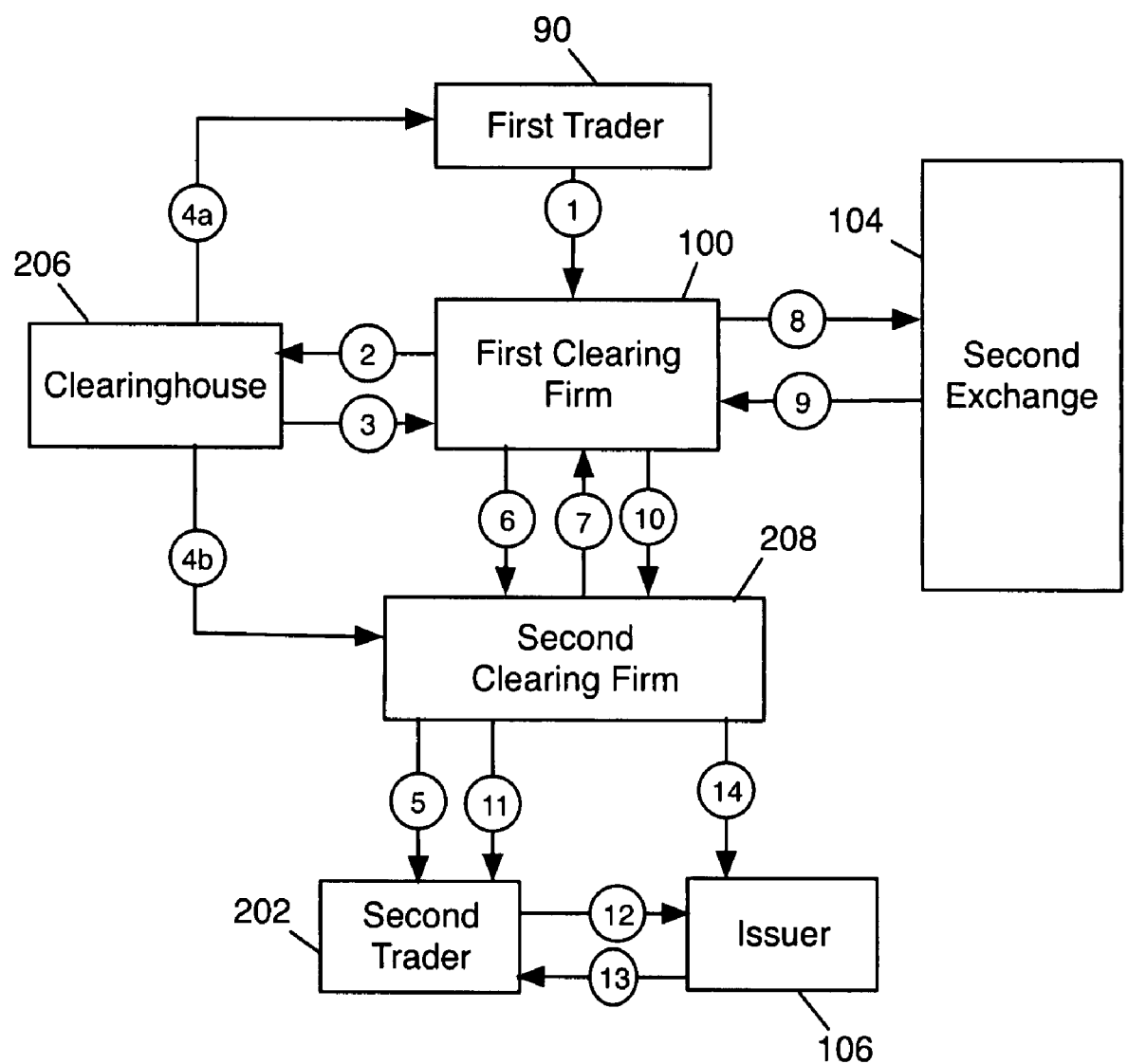
FIG. 3 depicts logical block diagram of another system and method of settling trades using the deliver instrument and proxy obtained in the manner depicted by FIG. 1

FIG. 3 shows how the first trader 90 may use the proxy obtained from the second exchange 104 to deliver on an obligation associated with a trade made with the second trader 202 on the first exchange 102. In particular, the first trader 90 notifies the first clearing firm 100 of a desire to initiate delivery (arrow 1). The first clearing firm 100 notifies the clearinghouse 206 (arrow 2) that the first trader 90 seeks to initiate delivery. The clearinghouse 206 notifies the first clearing firm 100 and the clearing firm 208 with pertinent details regarding the delivery (arrows 4a and 4b) as described hereinabove. The second clearing firm 208 notifies the second trader 202 (arrow 5) that the first trader 90 intends to deliver. The first clearing firm 100 thereafter forwards an invoice to the second clearing firm 208 (arrow 6) based on the amount to be paid as provided by the clearinghouse 206. The second clearing firm 208 then pays the amount due per the invoice to the first clearing firm 100 (arrow 7). Upon receiving payment, the first clearing firm 100 sends a request to the second exchange 104 that the proxy for the underlying product be converted into a delivery instrument (arrow 8). The second exchange 104 provides the delivery instrument associated with the proxy to the first clearing firm 100 (arrow 9). In some embodiments, the delivery instrument is the delivery instrument that the first clearing firm 100 provided to the second exchange 104 (at arrow 7 of FIG. 1) to obtain the proxy (at arrow 8 of FIG. 1). In other embodiments, the delivery instrument is equivalent to or fungible with the delivery instrument that the first clearing firm 100 provided to the second exchange 104 (at arrow 7 of FIG. 1) to obtain the proxy (at arrow 8 of FIG. 1). Referring once again to FIG. 3, the second exchange 104 adjusts the account of the first clearing firm 100 to indicate that the proxy has been replaced by the delivery instrument and nullifies the proxy. The first clearing firm 100 provides the delivery instrument to the second clearing firm 208 (arrow 10). If the delivery instrument is an electronic delivery instrument then the first clearing firm 100 generates and transmits a message to the second clearing firm 208 that requests the transfer of the electronic delivery instrument. If the delivery instrument is a paper bearer receipt or another physical delivery instrument, the first clearing firm 100 typically couriers the delivery instrument to the second clearing firm 208. The second clearing firm makes an entry in the account of the second trader 202 that the second trader 202 owns the underlying product associated with the delivery instrument.

If the second trader 202 wishes to take physical possession of the product associated with the delivery instrument and if the delivery instrument is a paper bearer receipt or equivalent, the second clearing firm 208 sends the delivery instrument to the second trader 202 (arrow 11). The second trader 202 thereafter surrenders the delivery instrument to the issuer 106 (arrow 12) and, in exchange, the issuer 106 provides the underlying product to the second trader 202 (arrow 13). In some embodiments, the second clearing firm 208 sends either a physical delivery instrument or an electronic delivery instrument to the issuer 106 (arrow 14) directly with identifying information about the second trader 202. The second trader 202, or a representative thereof, may thereafter appear at the issuer 106 to take possession of the product represented by the delivery instrument.

Referring once again to FIG. 1, in some embodiments, the first trader 90 sends the delivery instrument to a registrar (not shown) instead of the second exchange 104 and the registrar issues the proxy. In such embodiments, the registrar, instead of an exchange, validates the proxy and exchanges the proxy with a delivery instrument as described in FIGS. 2 and 3. Typically, the registrar is affiliated with the second exchange 104, the issuer 106, and/or the clearinghouse 206.

When the registrar receives the original delivery instrument and issues the electronic proxy, notations are made on the appropriate clearing firm's account. When a clearing firm wishes to receive either an electronic or paper delivery instrument in exchange for the electronic proxy, the clearing firm returns the electronic proxy to the registrar. The registrar issues the delivery instrument, cancels the proxy, and makes the appropriate notations within the clearing firm's account. The registrar maintains the original delivery instruments that are deposited, and exchanges the original delivery instruments for electronic proxies, and redistributes the delivery instruments when the electronic proxies are turned in.

Although the use of a delivery instrument and a proxy therefor are described in connection with delivery obligations associated with a futures contract, it should be apparent such delivery instruments and proxies may be used for deliveries associated with any other type of contractual obligation including over-the-counter (cash) trades, currency, foreign exchange, securities, equities, energy, general commodities, etc.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A computer implemented method of settling trades for product that has a physical delivery obligation, the method comprising:

electronically obtaining an authenticated delivery instrument, wherein the authenticated delivery instrument is authenticated by a first exchange and may be used to settle a trade undertaken on the first exchange and wherein the authenticated delivery instrument can be used to redeem the product;

electronically issuing a proxy for the delivery instrument, wherein the proxy may be exchanged for the authenticated delivery instrument; and electronically using the proxy to settle a trade undertaken on a second exchange.

2. The computer implemented method of claim 1, wherein the authenticated delivery instrument is a receipt.

3. The computer implemented method of claim 2, wherein the receipt is an entry in a database record associated with a clearing firm.

4. The computer implemented method of claim 2, wherein the receipt is electronically authenticated.

5. The computer implemented method of claim 3, wherein the receipt includes authentication information corresponding to an exchange.

6. The computer implemented method of claim 5, wherein receipt may be used to settle trades only at the exchange associated with the authentication information.

7. The computer implemented method of claim 1, wherein the authenticated delivery instrument is a shipping certificate.

8. The computer implemented method of claim 1, wherein the step of electronically using the proxy comprises the step of electronically redeeming the proxy for the authenticated delivery instrument.

9. The computer implemented method of claim 1, wherein step of electronically obtaining an authenticated delivery instrument comprises the step of verifying that an underlying product meets predetermined specifications.

10. The computer implemented method of claim 1, wherein the computer implemented method comprises the step of undertaking a trade.

11. The computer implemented method of claim 10, wherein the step of undertaking the trade comprises the step of trading a futures contract.

12. The computer implemented method of claim 10, wherein the step of undertaking the trade comprises the further step of undertaking a cash trade.

* * * * *